United States Patent [19]

Block

[11] 4,365,788
[45] Dec. 28, 1982

[54] PROCESS AND APPARATUS FOR DETERMINING THE LEVEL OF MOLTEN METAL IN A METALLURGICAL VESSEL, THE TEMPERATURE OF THE MOLTEN METAL AND THE EXTENT OF WEAR OF THE REFRACTORY LINING OF THE VESSEL

[75] Inventor: Franz-Rudolf Block, Roetgen, Fed. Rep. of Germany

[73] Assignee: Didier-Werke AG, Wiesbaden, Fed. Rep. of Germany

[21] Appl. No.: 371,490

[22] Filed: Apr. 23, 1982

[30] Foreign Application Priority Data

Apr. 28, 1981 [DE] Fed. Rep. of Germany ....... 3116688

[51] Int. Cl.³ .............................................. H05B 7/18
[52] U.S. Cl. ......................................... 266/44; 73/86; 266/78; 266/87; 266/94; 374/142
[58] Field of Search ....................... 266/44, 99, 87, 94, 266/78; 73/86, 341, 344; 136/227, 228, 234, 236

[56] References Cited

U.S. PATENT DOCUMENTS 3,580,078 5/1971 MacKenzie ........................... 73/344
3,898,366 8/1975 Aurini ................................... 266/99
4,102,708 7/1978 Dancy ................................. 136/230

Primary Examiner—L. Dewayne Rutledge
Assistant Examiner—Scott Kastler
Attorney, Agent, or Firm—Wenderoth, Lind & Ponack

[57] ABSTRACT

A metallurgical container has a refractory lining for containing a molten metal. A plurality of combination electrodes are provided at various positions of the refractory lining. Each combination electrode includes a refractory body having the property of high electrical conductivity at normal temperatures of the molten metal, and at least one electrical conductor embedded within the refractory body. Refractory material having a low electrical conductivity is positioned between the combination electrodes. A power source is connected to the electrical conductors of the plurality of combination electrodes to achieve first electrical resistances through the refractory bodies from the interior of the metallurgical container to the electrical conductors and second electrical resistances between the electrical conductors. Values of the first and second resistances are measured as parameters indicative of at least one of the level of the molten metal within the container, the temperature of the molten metal and the extent of wear of the refractory lining.

20 Claims, 5 Drawing Figures

PROCESS AND APPARATUS FOR DETERMINING THE LEVEL OF MOLTEN METAL IN A METALLURGICAL VESSEL, THE TEMPERATURE OF THE MOLTEN METAL AND THE EXTENT OF WEAR OF THE REFRACTORY LINING OF THE VESSEL

BACKGROUND OF THE INVENTION

The present invention relates to a process for determining the level of molten metal in a metallurgical vessel, the temperature of the molten level and the extent of wear of the refractory lining of the vessel. The present invention also relates to a metallurgical vessel or container including structure for determining the molten metal level, the molten metal temperature and the degree of wear of the refractory lining of the vessel.

With increases automation it is becoming more important to develop a system for monitoring the level of molten metal in metallurgical vessels and containers. Also, it is necessary to constantly control the temperature of the molten metal within such containers and to control the extent of wear or erosion of the refractory lining of such a metallurgical container. Such controls of course depend upon being able to measure such temperature and extent of wear.

With respect to determining the level of molten metal in a metallurgical container, for example a transfer ladle in a steel mill, it conventionally is necessary to attempt to visually observe such container so that it does not become overfull of spill over.

For metallurgical reasons, it is desirable that during a continuous casting operation the molten metal, for example molten steel, be cast without coming in contact with the surrounding air, that is that such system be closed. At the same time however, it is necessary that the level inside the casting tundish remain constant. The precondition for achieving such results is a continuous measuring of the level of the molten steel within the tundish.

In a transfer ladle or in an LD converter, a gross weight measurement to determine the level of the molten metal inside the ladle or converter frequently is not sufficiently accurate because the weight of the fireproof refractory lining changes during operation due to erosion and wear.

The problem of measuring the molten metal level is conditionally simplified if it is necessary to determine only upper and lower limits for the level, that is if the level has to be maintained below a certain level or between two levels.

In order to avoid rupture of a metallurgical container, it is important to constantly monitor temperatures within the container and wear or erosion of the fireproof refractory lining of the container.

A number of techniques are known to measure the level of a liquid. It is also known that electrically conducting liquids can serve to electrically connect contacts, whereby it is possible to determine from the electrical resistance between two electrodes whether the liquid level is below or above an upper electrode. However, all known electrodes will fail during continuous operation with materials that have high melting points, particularly steel. Thus, metal electrodes form alloys and melt. Electrodes made from graphite bars dissolve.

SUMMARY OF THE INVENTION

With the above discussion in mind, it is the object of the present invention to provide a process and metallurgical container whereby it is possible to determine the level of molten metal in the metallurgical container, the temperature of the molten metal and the extent of wear or erosion of the refractory lining of the container.

It is a further object of the present invention to provide such a process and metallurgical container whereby it is possible to measure, by reliable readings, at least one parameter indicative of the level of the molten metal, the temperature of the molten metal and the extent of wear of the refractory lining.

These objects are achieved in accordance with the present invention by the provision of a process and metallurgical container whereby a plurality of combination electrodes are provided at various positions of the refractory lining of the container. Each combination electrode includes a refractory body having the property of high electrical conductivity at normal temperatures of the molten metal within the container, i.e. at relatively high temperatures, and at least one electrical conductor embedded within the refractory body. A refractory material having a low electrical conductivity is positioned between the combination electrodes, such that the combination electrodes are electrically insulated from each other. A power source is connected to the electrical conductors of the plurality of combination electrodes to achieve first electrical resistances through the refractory bodies from the interior of the metallurgical container to the electrical conductors, i.e. leakage resistances, and second electrical resistances between the electrical conductors. Values of the first and second resistances are measured as parameters indicative of the level of the molten metal within the container and/or the temperature of the molten metal and/or the extent of wear of the refractory lining.

The refractory material between the combination electrodes has poor electrical conductivity for all temperatures of use of the container. Such material may consist of or contain magnesite or dolomite. If the refractory lining of the metallurgical container is formed of a material having a poor electrical conductivity, then the combination electrodes may be positioned within such refractory lining which thus acts as the refractory material having a low electrical conductivity. On the other hand, if the material of the refractory lining does not have a sufficiently low electrical conductivity, then each combination electrode may be surrounded by an insert of the refractory material having a low electrical conductivity.

A preferred combination electrode includes a refractory body formed of a refractory material, such as zirconium oxide bricks, having a high degree of electrical conductivity at high temperatures. It is to be understood that the term "high temperatures" as employed herein means normal elevated temperatures of molten metals conventionally employed in the art, such as molten steel. Furthermore, as employed herein the term "high electrical conductivity" of the refractory body of the combination electrode is intended to define an electrical conductivity at such high temperatures which is sufficient to enable a reading of change of electrical resistance through the combination electrode by normal resistance measuring technology. One such dimension of suitably "high electrical conductivity" would be an electrical conductivity at 1500° C. of approximately 0.01 to 0.2 ohm$^{-1}$ cm$^{-1}$. However, this specific range is intended to be exemplory only. The refractory body of the combination electrode has integrally provided therein materials which have a relatively high conductivity even at low temperatures, for example metals or graphite, thereby forming electrical conductors.

To make sure that no deposits, so called "skulls" interfere with the intended electrical contact between the molten metal and the combination electrode, in accordance with a further aspect of the present invention inert gas may be injected into the interior of the container through the combination electrode itself or through a gas permeable porous brick or sink positioned beneath each combination electrode. The inert gas prevents the formation of deposits on the combination electrodes so that the molten metal and the combination electrodes can make good electrical contact.

The plurality of combination electrodes are positioned on at least part of the container wall such that some of the combination electrodes are at the same level in the container and laterally spaced from each other, and others of the combination electrodes are vertically spaced from each other and from the laterally spaced combination electrodes. Measured changes of values of the first and second resistances of the laterally spaced and vertically spaced combination electrodes are indicative of changes of the level of the molten metal and of the temperature of the molten metal. Thus, with combination electrodes arranged at the same level, it is relatively easy to recognize the formation of hardened metallic deposits in the contact area of a particular combination electrode. That is, the contact resistance between the electrode and the skull is generally substantially higher than between an electrode and directly contacting molten metal. This is caused not only by better electrical contact, but also by a lower temperature at the front of the electrode on which is a deposit, thereby decreasing the conductivity. Also, the vertically spaced electrodes may be employed to indicate level of the molten metal. Thus, slag on top of the molten metal adjacent a first combination electrode will evidence a higher resistance reading through such combination electrode, whereas the molten metal beneath the slag and in contact with a second combination electrode below the first combination electrode will evidence a lower resistance reading with respect to the second lower combination electrode. Additionally, an indication of relative temperature can be deduced from the laterally and vertically spaced electrodes, higher temperatures causing increased conductivity and reduced resistance.

In accordance with a further feature of the present invention, at least certain of the combination electrodes may be positioned at differing relative positions with respect to the thickness of the wall of the container, such that measured changes of values of the first and second resistances of such combination electrodes are indicative of the extent of wear of the refractory lining of the wall. More specifically, in containers which experience strong erosion of the refractory lining, such as LD converters, the electrodes which are positioned relatively further spaced from the initial interior of the wall do not become operational until the preceding or more interior electrodes and refractory lining have been eroded. Thus, when an relatively more exteriorly initially positioned electrode commences being conductive, then such electrode provides a relatively accurate indication relating to the degree of wear or erosion of the fireproof refractory lining.

In a similar arrangement, at least one combination electrode may be provided with a plurality of pairs of conductors, the conductors of each pair being equal in length, but the pairs being of differing length, such that the pairs are spaced from the original inner wall of the combination electrode by differing distances. Thus, measured changes of values of the first and second resistances of the different length pairs of conductors are indicative of the extent of wear of the refractory lining.

In accordance with another aspect of the present invention, each combination electrode may include at least one conductor formed of a plurality of electrically conductive metal, for example steel, wires that are gathered together to form a flexible cord or band which is embedded in the refractory body in a meandering or sine-shaped configuration. Embedding of the cord or band in this manner minimizes the danger of rupture of the electrical conductor. This type of electrode is relatively inexpensive, so that it is possible to use a large member without resulting in an appreciable cost increase. This also makes it possible to cover various bath levels and corrosion depths as well as to measure such parameters by several electrodes at the same time.

By the arrangement of the present invention the resistance through the refractory body to a particular conductor and the resistance between two particular conductors provides information concerning the molten metal level as well as the temperature of the inner face of the refractory body and therefore the temperature of the molten metal, and as well as the degree of erosion of the refractory body, and therefore of the refractory lining.

In accordance with a further aspect of the present invention, each combination electrode can be formed of a brick or a block of zirconium oxide with added calcium oxide and/or titanium oxide. This increases electrical conductivity at high temperatures. The electrical conductor, particularly gathered in the form of a flexible cord or a band, will receive a charge through the hotter portion of the refractory brick from the molten metal and will transfer such charge through the relatively colder portion of the refractory brick to a metallic conductor on the exterior side of the brick or the wall of the container.

One arrangement of the present invention provides for the electrical conductors to be embedded between two plates which are joined together with the conductor positioned therebetween, or within a brick.

When bricks which are oxidized are fired, the electrical conductors can initially be embedded together in the refractory mass and can be exposed on one side after the firing process by cutting off portions of the resultant fired molded bricks or by cutting them in half. Also, it is possible to position the conductors between two already fired plates, because the conductors are relatively thin and thereby the molten metal will not substantially penetrate between the plates.

It is believed that those of ordinary skill in the art, upon considering the present disclosure, will understand what materials may be employed to form the refractory bodies which have the properties of high electrical conductivity at normal temperatures of molten metal. In addition to the zirconium oxide and zirconium oxide with added calcium oxide and/or titanium oxide, additional materials may be employed, as long as the resultant refractory bodies have the properties of being refractory or fireproof as such terms are employed in the art, and as long as such refractory bodies have a sufficiently high electrical conductivity at normal temperatures of molten metals employed to result in being able to detect resistance values and changes thereof in the manner described herein and representative of melt level, melt temperature and degree of erosion of the refractory lining of the container. An additional example of a refractory body having the property of high electrical conductivity at normal temperatures of molten metal is 96% by weight $ZrO_2$, 3% by weight MgO, with the remainder being pollutants such as $Al_2O_3$ and $SiO_2$. Another example involves a refractory body formed of 95% by weight $ZrO_2$, 4% by weight CaO, with the remainder being pollutants. In these two examples, the components are mixed according to known fine ceramic procedures, are shaped to a body or block configuration as desired, and are baked at a temperature of about 1780° C. The resultant baked refractory body has a porosity of about 15% volume. Again, however, these examples are intended to be exemplary only and not limiting of the scope of the present invention.

For safety reasons, the selected measuring voltage is low, preferably below the permissable shock hazzard voltage of 42 volts. Power is supplied by a battery or the network by way of an isolating transformer. Evaluation of the measuring data will be adjusted each operation to the particular requirements of such operation. Suitable equipment, from a simply threshold value circuit breaker to a micro processor is available for all such applications.

BRIEF DESCRIPTION OF THE DRAWINGS

Other objects, features and advantages of the present invention will be apparent from the following detailed description of various embodiments thereof, taken with the accompanying drawings, wherein.

DETAILED DESCRIPTION OF THE INVENTION

Figure 1:
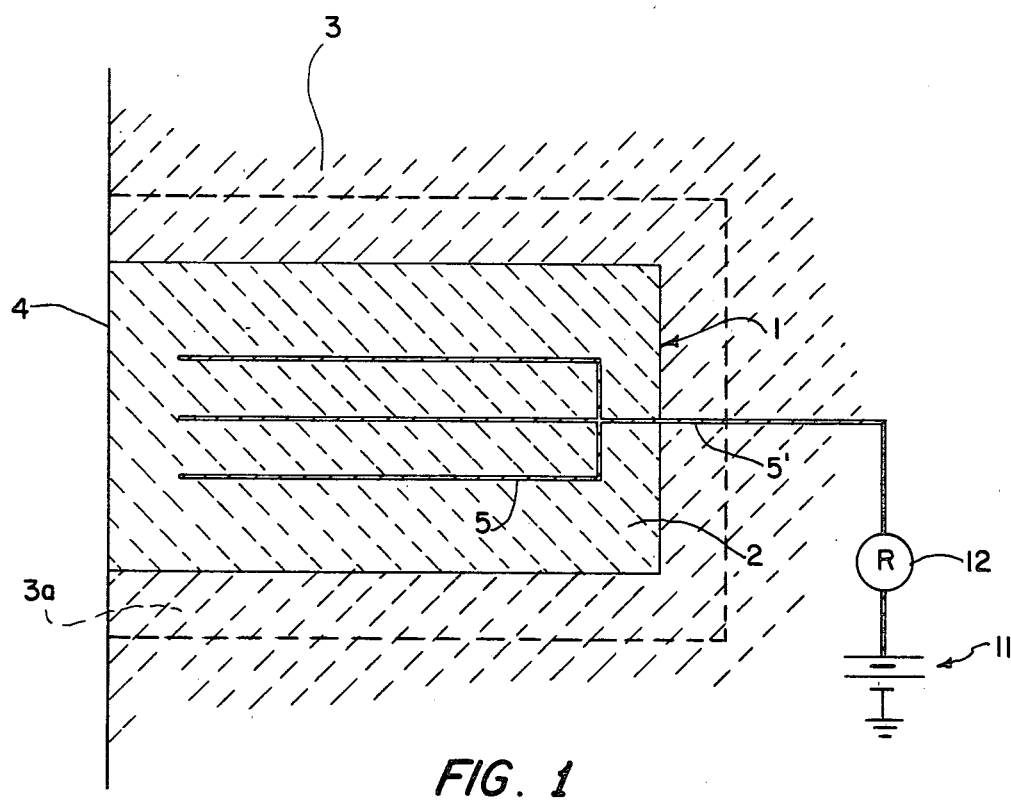
FIG. 1 is a schematic vertical cross sectional view through a portion of a metallurgical container including a combination electrode according to one embodiment of the present invention.

In FIG. 1 there is shown a combination electrode 1 in accordance with the present invention and embedded in a refractory lining 3 of a wall of a metallurgical vessel. The combination electrode 1 includes a refractory body 2, for example a rectangularly configured brick, formed of a material having the property of high electrical conductivity at normal temperatures of molten metal positioned within the refractory lining 3 of the metallurgical container. Refractory body 2 has an inner surface 4 which is flush with the inner surface of the refractory lining 3 and which may be exposed to molten metal (not shown) within the metallurgical container. Thus, body 2 completes the refractory lining 3.

Positioned within, for example embedded within, refractory body 2 is an electrical conductor formed of plural conductors 5 which are connected to a conductor, for example metallic conductor 5', which extends through the exterior portion of block 2 and through the wall of the container to the exterior of the vessel. Due to the fact that conductors 5 are spaced from inner wall 4 of block 2, and since conductors 5 are formed of a normal heat resistant, electrically conductive material, conductors 5 will not be destroyed as is the case in conventional arrangements.

Surrounding each combination electrode 1, as indicated above formed by refractory block 2 and electrodes 5, is a refractory material having a low electrical conductivity, thereby electrically isolating the plurality of combination electrodes from each other. When the lining 3 of the container is formed of a refractory material having a low electrical conductivity, then the electrodes 1 may be embedded directly in the refractory lining 3. However, when the material of refractory lining 3 does not have a sufficiently low conductivity, each electrode 1 may be surrounded by an insert 3a which is embedded within refractory lining 3, as shown by dashed lines in FIG. 1. Conductor 5' connects conductors 5 to an electrical power source, for example a battery 11. Thus, there occurs a first electrical resistance through refractory body 2 from the interior of the metallurgical container to the innermost ends of the electrical conductors 5, and second electrical resistances between the electrical conductors 5. This is made possible due to the fact that body 2 has a high electrical conductivity at high temperatures, i.e. the temperatures to which the body 2, at least the innermost portion thereof, will be raised due to the existance of molten metal contacting face 4. Values of these first and second resistances may be measured, for example by device 12 shown schematically in FIG. 1, and the measured resistance values are parameters indicative of at least one of the level of the molten metal within the container, the temperature of the molten metal, and the extent of wear of the refractory lining 3. It is of course to be understood that the power source and measuring device are shown schematically only in FIG. 1 and that any known measuring device, such as a measuring network including a transformer, may be employed.

There may be provided structure for injecting an inert gas into the interior of the container to prevent the formation on the inner surface 4 of the combination electrode of deposits which would interfere with the electrical contact between the molten metal and the combination electrode. The inert gas may be injected directly through the block 2 of the combination electrode or may be passed through a gas permeable porous brick positioned beneath each combination electrode. The conductor or conductors within each refractory body 2 may be shaped and configured to achieve a desired measurement of level and/or temperature and/or wear. Thus, in FIG. 1 there are shown plural vertically spaced conductors 5.

Figure 2:
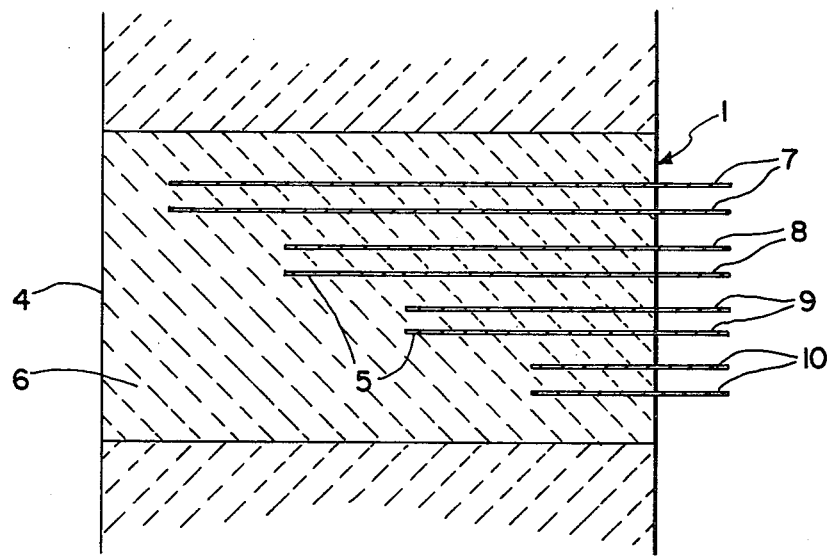
FIG. 2 is a view similar to FIG. 1 but illustrating a modified combination electrode.

FIG. 2 shows a different arrangement wherein the conductors 5 are formed into a plurality of pairs of conductors, for example pairs 7, 8, 9, 10. The conductors of each pair are of the same length. However, each pair is of different length such that the pairs are spaced from the inner wall 4 of the combination electrode by different distances. Thereby, measured changes of values of the first and second resistances of the pairs 7-10 are indicative of the extent of wear of the refractory body 6, and therefore of the refractory lining of the container.

Figure 3:
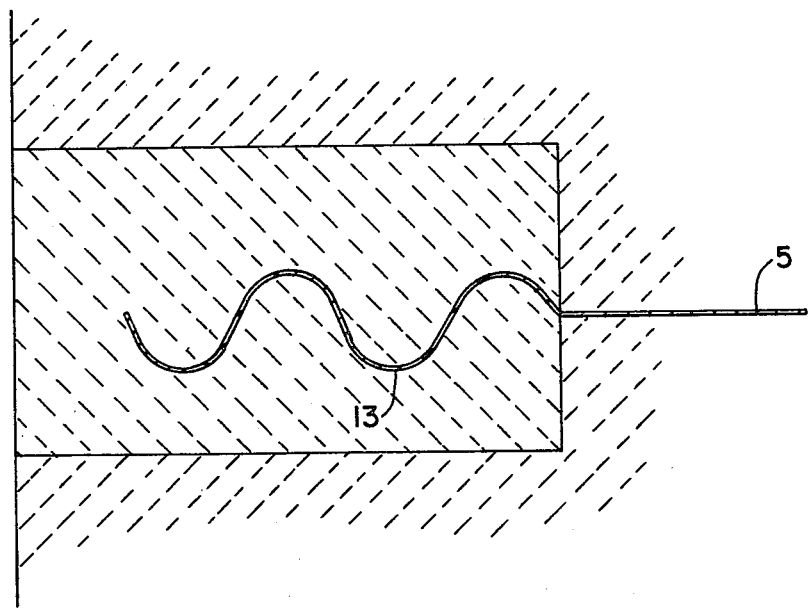
FIG. 3 is a somewhat schematic horizontal cross sectional view illustrating a further embodiment of the present invention.

FIG. 3 shows an arrangement wherein the electrical conductor is formed of a plurality of electrically conductive metal wires gathered together in the shape of a flexible cord or a band 13 embedded in the refractory body. Flexible cord or a band 13 is given a meandering or sine-shaped configuration.

Figure 4:
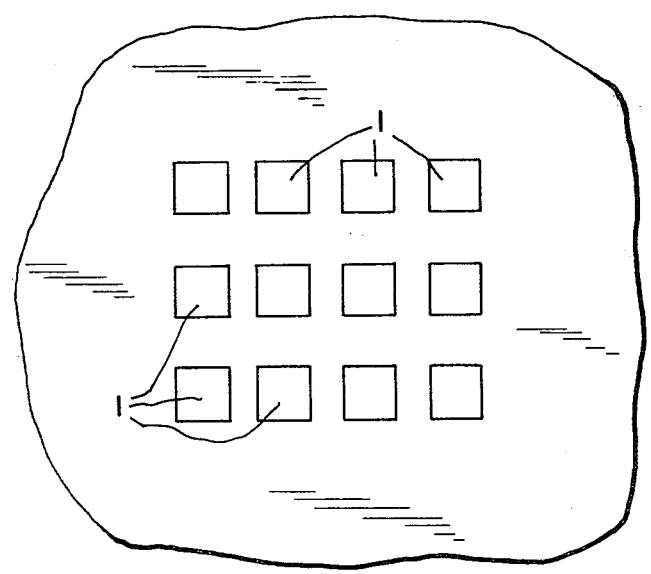
FIG. 4 is a schematic elevation view of a portion of the inner wall of the metallurgical container and the arrangement therein of a plurality of combination electrodes.

FIG. 4 schematically shows an arrangement whereby a plurality of combination electrodes 1 are positioned in the refractory lining of the container such that some of the electrodes 1 are laterally spaced from each other at the same level within the container wall, with the electrodes 1 also being vertically spaced with respect to each other. In this arrangement, it will be apparent that measured changes of the values of the first and second resistances of the laterally and vertically spaced combination electrodes 1 are indicative of changes of the level of the molten metal and of the temperature of the molten metal.

Figure 5:
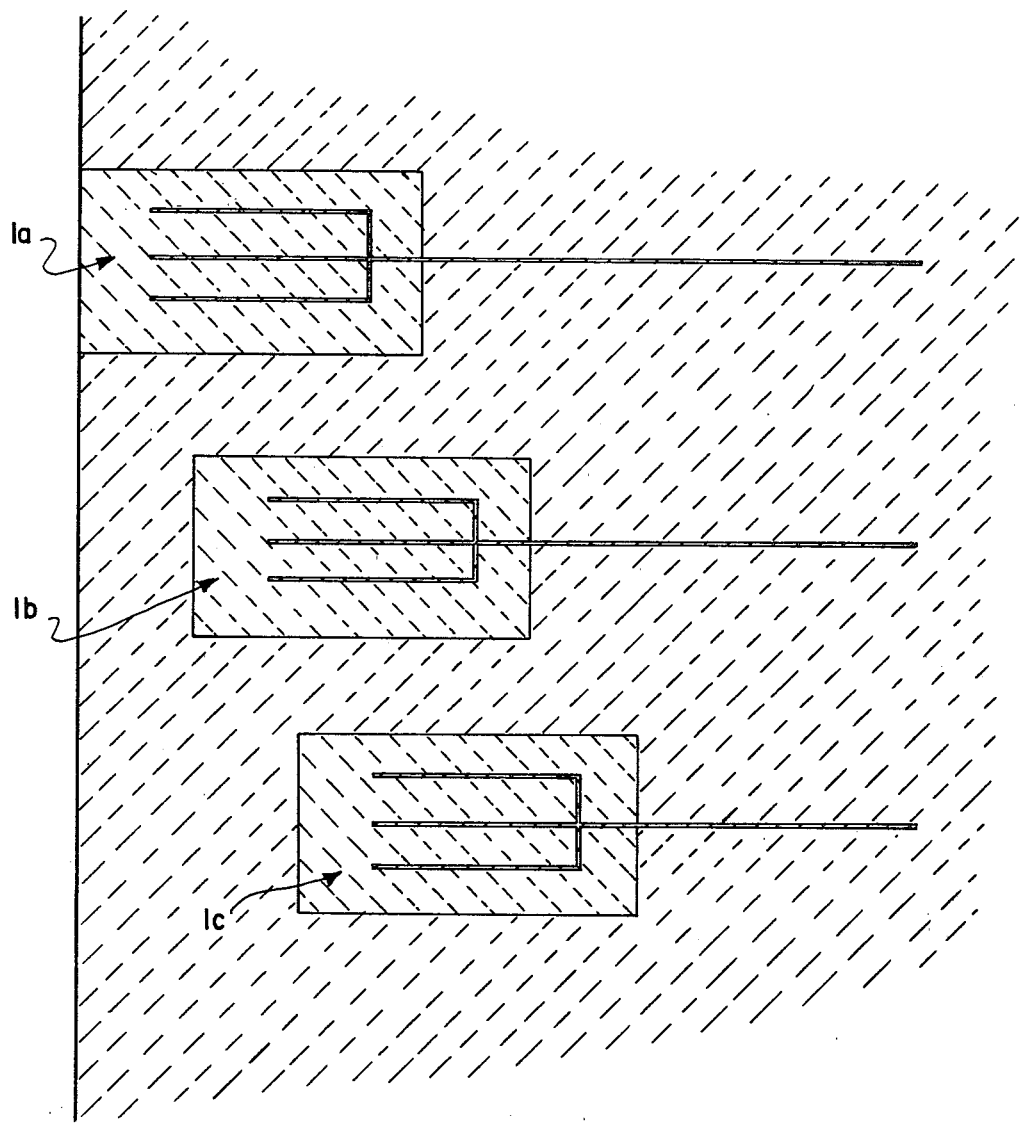
FIG. 5 is a view similar to FIGS. 1 and 2, but showing a further modification of the present invention.

FIG. 5 illustrates an alternative to the arrangement shown in FIG. 2. Thus, in FIG. 5 a plurality of combination electrodes 1a, 1b, 1c are provided at differing relative positions with respect to the thickness of the wall of the container. Thus, measured changes of the values of the first and second resistances of combination electrodes 1a, 1b, 1c are indicative of the extent of wear of the refractory lining of the wall.

Although the present invention has been described and illustrated with respect to preferred features thereof, it is to be understood that various modifications may be made to the specifically described and illustrated structural arrangements without departing from the scope of the present invention.

What I claim is:

1. A process, for use in a metallurgical container having a refractory lining and containing molten metal, of measuring at least one parameter indicative of at least one of the level of said molten metal within said container, the temperature of said molten metal, and the extent of wear of said refractory lining, said process comprising:
   providing a plurality of combination electrodes, each including a refractory body having the property of high electrical conductivity at normal temperatues of said molten metal, and electrical conductor means embedded within said refractory body;
   positioning said plurality of combination electrodes at various positions of said refractory lining, with refractory material having a low electrical conductivity positioned between said combination electrodes;
   connecting a power source to said electrical conductor means of said plurality of combination electrodes, whereby there occur first electrical resistances through said refractory bodies from the interior of said metallurgical container to said electrical conductor means and second electrical resistances between said electrical conductor means; and
   measuring values of said first and second resistances as parameters indicative of at least one of said level of said molten metal within said container, said temperature of said molten metal, and the extent of wear of said refractory lining.

2. A process as claimed in claim 1, further comprising injecting inert gas through said combination electrodes or through gas permeable porous bricks positioned therebeneath, and thereby preventing the formation on the inner surfaces of said combination electrodes of deposits which would interfere with contact between said molten metal and said combination electrodes.

3. A process as claimed in claim 1, comprising positioning said combination electrodes such that some of said combination electrodes are at the same level in said container and laterally spaced from each other, and others of said combination electrodes are vertically spaced from said some combination electrodes, with inner faces of at least certain of said combination electrodes being exposed to the interior of said container, and measured changes of values of said first and second resistances of said laterally and vertically spaced combination electrodes are indicative of changes of said level of said molten metal and of said temperature of said molten metal.

4. A process as claimed in claim 1 or 3, comprising positioning at least certain of said combination electrodes at differing relative positions with respect to the thickness of the wall of said container, and measured changes of values of said first and second resistances of said certain combination electrodes are indicative of the extent of wear of said refractory lining of said wall.

5. A process as claimed in claims 1 or 3, comprising providing at least one said combination electrode with a plurality of pairs of said electrical conductor means, said pairs being spaced from an inner wall of said combination electrode by differing distances, and measured changes of values of said first and second resistances of said pairs are indicative of the extent of wear of said refractory lining.

6. In a metallurgical container having a refractory lining for containing a molten metal, the improvement comprising means for measuring at least one parameter indicative of at least one of the level of the molten metal within said container, the temperature of said molten metal, and the extent of wear of said refractory lining, said measuring means comprising:
   a plurality of combination electrodes provided at various positions of said refractory lining, each said combination electrode including a refractory body having the property of high electrical conductivity at normal temperatures of said molten metal, and electrical conductor means embedded within said refractory body;
   refractory material having a low electrical conductivity positioned between said combination electrodes;
   power source means connected to said electrical conductor means of said plurality of combination electrodes for achieving first electrical resistances through said refractory bodies from the interior of said metallurgical container to said electrical conductor means and second electrical resistances between said electrical conductor means; and
   resistance measuring means for measuring values of said first and second resistances as parameters indicative of at least one of said level of said molten metal within said container, said temperature of said molten metal, and the extent of wear of said refractory lining.

7. The improvement claimed in claim 6, wherein said refractory material having a low electrical conductivity comprises said refractory lining of said container.

8. The improvement claimed in claim 6, wherein said refractory material having a low electrical conductivity comprises inserts surrounding each said combination electrode and embedded in said refractory lining.

9. The improvement claimed in claim 6, further comprising means for injecting inert gas into the interior of said container and thereby for preventing the formation of the inner surfaces of said combination electrodes of deposits which would interfere with contact between said molten metal and said combination electrodes.

10. The improvement claimed in claim 9, wherein said injecting means comprises gas permeable porous bricks positioned beneath each said combination electrode.

11. The improvement claimed in claim 9, wherein said injecting means comprises means for passing said inert gas through each of said refractory bodies of said combination electrodes.

12. The improvement claimed in claim 6, wherein said combination electrodes are positioned such that some of said combination electrodes are at the same level in said container and are laterally spaced from each other, and others of said combination electrodes are vertically spaced from said some combination electrodes.

13. The improvement claimed in claims 6 or 12, wherein inner faces of said combination electrodes are exposed to the interior of said container.

14. The improvement claimed in claims 6 or 13, wherein at least certain of said combination electrodes are positioned at differing relative positions with respect to the thickness of the wall of said container.

15. The improvement claimed in claims 6 or 13, wherein said electrical conductor means of at least one of said combination electrodes comprise a plurality of pairs of conductors, the conductors of each said pair being equal in length, and said pairs being of differing lengths, such that said pairs are spaced from the inner wall of said combination electrode by differing distances.

16. The improvement claimed in claim 6, wherein said electrical conductor means of each said combination electrode comprises at least one conductor formed of a plurality of electrically conductive metal wires gathered together in a band embedded in the respective refractory body.

17. The improvement claimed in claim 16, wherein said metal wires comprise steel wires.

18. The improvement claimed in claim 16, wherein said band has a meandering or sine-shaped configuration within said refractory body.

19. The improvement claimed in claim 16, wherein said refractory body comprises two plates joined together with said conductor positioned therebetween.

20. The improvement claimed in claims 6 or 16, wherein said refractory bodies comprise bricks of zirconium oxide with added calcium oxide and/or titanium oxide.

* * * * *